US008459467B2

(12) United States Patent
Reilly et al.

(10) Patent No.: US 8,459,467 B2
(45) Date of Patent: Jun. 11, 2013

(54) SOFC CATHODE AND METHOD FOR COFIRED CELLS AND STACKS

(75) Inventors: Christopher J. Reilly, Whitinsville, MA (US); Guangyong Lin, Shrewsbury, MA (US); Yeshwanth Narendar, Westford, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 607 days.

(21) Appl. No.: 12/648,722

(22) Filed: Dec. 29, 2009

(65) Prior Publication Data

US 2010/0167164 A1 Jul. 1, 2010

Related U.S. Application Data

(60) Provisional application No. 61/204,034, filed on Dec. 31, 2008.

(51) Int. Cl.
*H01M 8/22* (2006.01)

(52) U.S. Cl.
USPC .......... 210/405; 29/623.1; 429/465; 429/479; 429/485; 429/535

(58) Field of Classification Search
USPC ................. 429/403, 405, 465, 466, 479–481, 429/485, 491, 495, 532, 533, 535; 29/623.1
See application file for complete search history.

(56) References Cited

U.S. PATENT DOCUMENTS

| 4,913,982 | A | * | 4/1990 | Kotchick et al. | 429/535 |
| 5,273,837 | A | * | 12/1993 | Aitken et al. | 429/496 |
| 5,342,705 | A | * | 8/1994 | Minh et al. | 429/479 |
| 5,356,730 | A | * | 10/1994 | Minh et al. | 429/479 |
| 5,543,241 | A | * | 8/1996 | Nishioka et al. | 429/458 |
| 5,882,809 | A | * | 3/1999 | McPheeters et al. | 429/456 |
| 5,922,486 | A | * | 7/1999 | Chiao | 429/465 |
| 6,296,962 | B1 | | 10/2001 | Minh | |

(Continued)

FOREIGN PATENT DOCUMENTS

| JP | 05-036417 A | 2/1993 |
| JP | 07-045291 A | 2/1995 |

(Continued)

OTHER PUBLICATIONS

Notification of Transmittal of the International Search Report and the Written Opinion of the International Searching Authority, or the Declaration, from PCT/US2009/069725, 10 pp., date of mailing Jul. 14, 2010.

(Continued)

*Primary Examiner* — Joseph Drodge
(74) *Attorney, Agent, or Firm* — Robert N. Young; Abel Law Group, LLP

(57) ABSTRACT

A solid oxide fuel cell includes an anode layer, an electrolyte layer over a surface of the anode layer, and a cathode layer over a surface of the electrolyte layer. The cathode layer includes a cathode bulk layer, a porous cathode functional layer at an electrolyte, an intermediate cathode layer partitioning the cathode bulk layer and the porous cathode functional layer, the porous intermediate cathode layer having a porosity greater than that of the cathode bulk layer. The solid oxide fuel cells can be combined to form subassemblies that are bonded together to form solid oxide fuel cell assemblies.

21 Claims, 5 Drawing Sheets

U.S. PATENT DOCUMENTS

| | | | |
|---|---|---|---|
| 7,745,031 B2 * | 6/2010 | Larsen et al. | 429/495 |
| 2002/0164523 A1 | 11/2002 | Shibata et al. | |
| 2002/0177031 A1 | 11/2002 | Doshi et al. | |
| 2005/0214612 A1 * | 9/2005 | Visco et al. | 429/30 |
| 2007/0178366 A1 * | 8/2007 | Mahoney et al. | 429/44 |
| 2007/0237999 A1 | 10/2007 | Donahue et al. | |
| 2008/0248361 A1 | 10/2008 | Larsen et al. | |
| 2010/0285391 A1 * | 11/2010 | Higuchi et al. | 429/483 |
| 2013/0025292 A1 | 1/2013 | Larsen et al. | |

FOREIGN PATENT DOCUMENTS

| | | |
|---|---|---|
| JP | 09-050812 A | 2/1997 |
| JP | 2002-329508 A | 11/2002 |
| JP | 2002-329509 A | 11/2002 |
| JP | 2008-034373 A | 2/2008 |
| KR | 10-2004-0007492 | 1/2004 |
| KR | 10-2008-0039540 | 5/2008 |
| WO | WO2007/025762 A | 3/2007 |

OTHER PUBLICATIONS

Notification of Transmittal of International Preliminary Report on Patentability, International Application No. PCT/US2009/069725, date of mailing Jul. 14, 2011.

* cited by examiner

| Stack 8 | Stack 8 w/terminal anode | Stack 10 | Stack 10 w/terminal anode |
|---|---|---|---|
| A-18 | A-18 | A-18 | A-18 |
| AFL-22 | AFL-22 | AFL-22 | AFL-22 |
| EI-24 | EI-24 | EI-24 | EI-24 |
| CFL-32a | CFL-32a | CFL-32a | CFL-32a |
| CIL-32b | CIL-32b | CIL-32b | CIL-32b |
| C-28 | C-28 | C-28 | C-28 |
| IC-34 | IC-34 | IC-34 | IC-34 |
| ABL-44 | TA-36 | ABL-44 | TA-36 |
| A-18 | ABL-44 | A-18 | ABL-44 |
| AFL-22 | A-18 | AFL-16 | A-18 |
| EI-24 | AFL-22 | EI-24 | AFL-22 |
| CFL-32a | EI-24 | CFL-32a | EI-24 |
| CIL-32b | CFL-32a | CIL-32b | CFL-32a |
| C-28 | CIL-32b | C-28 | CIL-32b |
| IC-34 | C-28 | IC-34 | C-28 |
| ABL-44 | IC-34 | BL-38 | IC-34 |
| A-18 | TA-36 | A-18 | TA-36 |
| AFL-22 | ABL-44 | AFL-22 | BL-38 |
| EI-24 | A-18 | EI-24 | A-18 |
| CFL-32a | AFL-22 | CFL-32a | AFL-22 |
| CIL-32b | EI-24 | CIL-32b | EI-24 |
| C-28 | CFL-32a | C-28 | CFL-32a |
| IC-34 | CIL-32b | IC-34 | CIL-32b |
| | C-28 | ABL-44 | C-28 |
| | IC-34 | A-18 | IC-34 |
| | TA-36 | AFL-22 | TA-36 |
| | | EI-24 | ABL-44 |
| | | CFL-32a | A-18 |
| | | CIL-32b | AFL-22 |
| | | C-28 | EI-24 |
| | | IC-34 | CFL-32a |
| | | | CIL-32b |
| | | | C-28 |
| | | | IC-34 |
| | | | TA-36 |

SOFC CATHODE AND METHOD FOR COFIRED CELLS AND STACKS

RELATED APPLICATION

This application claims the benefit of U.S. Provisional Application No. 61/204,034, filed on Dec. 31, 2008. The entire teachings of the above application are incorporated herein by reference.

BACKGROUND OF THE INVENTION

Fuel cells generate electricity by a chemical reaction wherein oxygen gas is reduced to oxygen ions ($O^{2-}$) at a cathode, and a fuel gas, such as $H_2$ gas, is oxidized with the oxygen ions to form water at an anode. Solid oxide fuel cells employ a hard, ceramic compound metal (e.g., calcium or zirconium) oxide as an electrolyte between a functioning cathode and a functioning anode.

In some embodiments, fuel cells are arranged in stacks, whereby subassemblies, each including a cathode, an anode and a solid electrolyte between the cathode and anode, are assembled in series by locating an electrical interconnect between the cathode of one subassembly and the anode of another. However, fabrication of fuel cells and stacks can be susceptible to damage caused by a fluctuation in temperature. Rapid changes in temperature also can affect the life of fuel cells as a consequence of differences in coefficients of thermal expansion among the materials that make up the cathode, electrolyte, anode and interconnect components. Moreover, some components of fuel cell subunits, such as porous layers, including active cathode functional layers of fuel cell subunits, preferably are exposed to lower temperatures during fabrication than generally are required for the remainder of each fuel cell subunit. All of these problems are compounded by assembling fuel cell subunits in stacks which must be co-fired during production, and by extended use of stacked assemblies which may be exposed to repetitive and dramatic changes in temperatures during normal operation.

Therefore, a need exists to minimize or eliminate the above mentioned problems.

SUMMARY OF THE INVENTION

The invention generally is directed to a solid oxide fuel cell and a method of fabricating at least one solid oxide fuel cell.

The solid oxide fuel cell includes an anode layer, an electrolyte layer over a surface of the anode layer, and a cathode layer over a surface of the electrolyte layer. The cathode layer includes a porous cathode functional layer over the electrolyte layer, a cathode bulk layer, and a porous intermediate cathode layer partitioning the cathode bulk layer and the porous cathode functional layer, the porous intermediate cathode layer having a porosity greater than that of the cathode bulk layer.

In another embodiment, the invention is a solid oxide fuel cell assembly that includes at least two subassemblies each subassembly independently including at least one subcell. Each subcell includes an anode layer, an electrolyte layer over a surface of the anode layer, and a cathode layer over a surface of the electrolyte layer. The cathode layer includes a porous cathode functional layer over the electrolyte, a cathode bulk layer, and a porous intermediate cathode layer partitioning the cathode bulk layer and the porous cathode functional layer, the porous cathode intermediate layer having a porosity greater than that of the cathode bulk layer. Each subcell is partitioned by an electrical interconnect and is operable by oxidation of a fuel directed to the anode to thereby form at least water. The subassemblies are bonded together by a bonding layer between adjacent subassemblies.

A method of the invention includes forming an anode subcomponent of a solid oxide fuel cell, the anode subcomponent including an anode layer and an electrolyte layer over the anode layer. A cathode subcomponent is formed separately from the anode subcomponent. The cathode subcomponent includes a cathode layer and an interconnect layer over the cathode layer. The anode subcomponent and the cathode subcomponent are then combined so that the cathode layer abuts the electrolyte layer, thereby forming a solid oxide fuel cell.

This invention has many advantages. For example, separate fabrication of anode/electrolyte and cathode/interconnect subcomponents provides for greater flexibility in conditions under which the components are assembled to form the fuel cell. In one embodiment, separate fabrication of the anode/electrolyte and cathode/interconnect subcomponents can be conducted at higher temperatures, followed by assembly of fuel cell components by insertion of a porous, cathode functional layer between the cathode layer of one subcomponent and the electrolyte layer of the other subcomponent, and subsequent firing of the assembly at a temperature significantly below that required to optimally prepare the anode/electrolyte and cathode/interconnect subcomponents. Other fuel cell components can be included in each subassembly by this technique, whereby lower temperatures are employed during assembly of the components than are required to produce respective subcomponents. Examples of such other subcomponents include nonfunctional anode layers and bonding components, such as compositions that include nickel mesh, which can be employed to link assemblies of fuel cells previously linked in series. Also, fabrication techniques and materials that constitute the cathode layer can be optimized by fabricating a cathode bulk layer in combination with an interconnect layer prior to incorporation of a porous active functional cathode layer during assembly of a fuel cell. Moreover, a subcomponent cathode layer can include air channels at an interface between cathode bulk and cathode functional layers, thereby eliminating the requirement of air permeability through the cathode bulk, and simplifying co-firing of the cathode bulk layer adjacent the interconnect layer of each fuel cell component of a fuel cell assembly. In addition, cathode bulk layers generally provide greater mechanical support at interconnect layers than do porous counterparts. Further, additional fabrication techniques can be employed, such as molding or machining channel structures into a portion of a cathode bulk layer distal to the interface with an interconnect layer, prior to combination with a porous green body that will be co-fired with the bulk cathode/interconnect and anode/electrolyte subcomponents to form a fuel cell component of a fuel cell assembly.

The present invention can be used in a solid oxide fuel cell (SOFC) system. SOFCs offer the potential of high efficiency electricity generation, with low emissions and low noise operation. They are also seen as offering a favorable combination of electrical efficiency, co-generation heat efficiency and fuel processing simplicity. One example of a use for SOFCs is in a home or other building. The SOFC can use the same fuel that is used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or non-existent.

BRIEF DESCRIPTION OF THE DRAWINGS

FIG. 6 is a representation of fuel cell subassemblies connected in series. A=Anode layer, AFL=Anode Functional Layer, El=Electrolyte layer, CFL=Cathode Functional Layer, CIL=Cathode Intermediate Layer, A=Anode layer, C=Cathode layer, IC=Interconnect layer, ABL=Anode Bonding Layer, BL=Bonding Layer, TA=Terminal Anode layer.

DETAILED DESCRIPTION OF THE INVENTION

Figure 1:
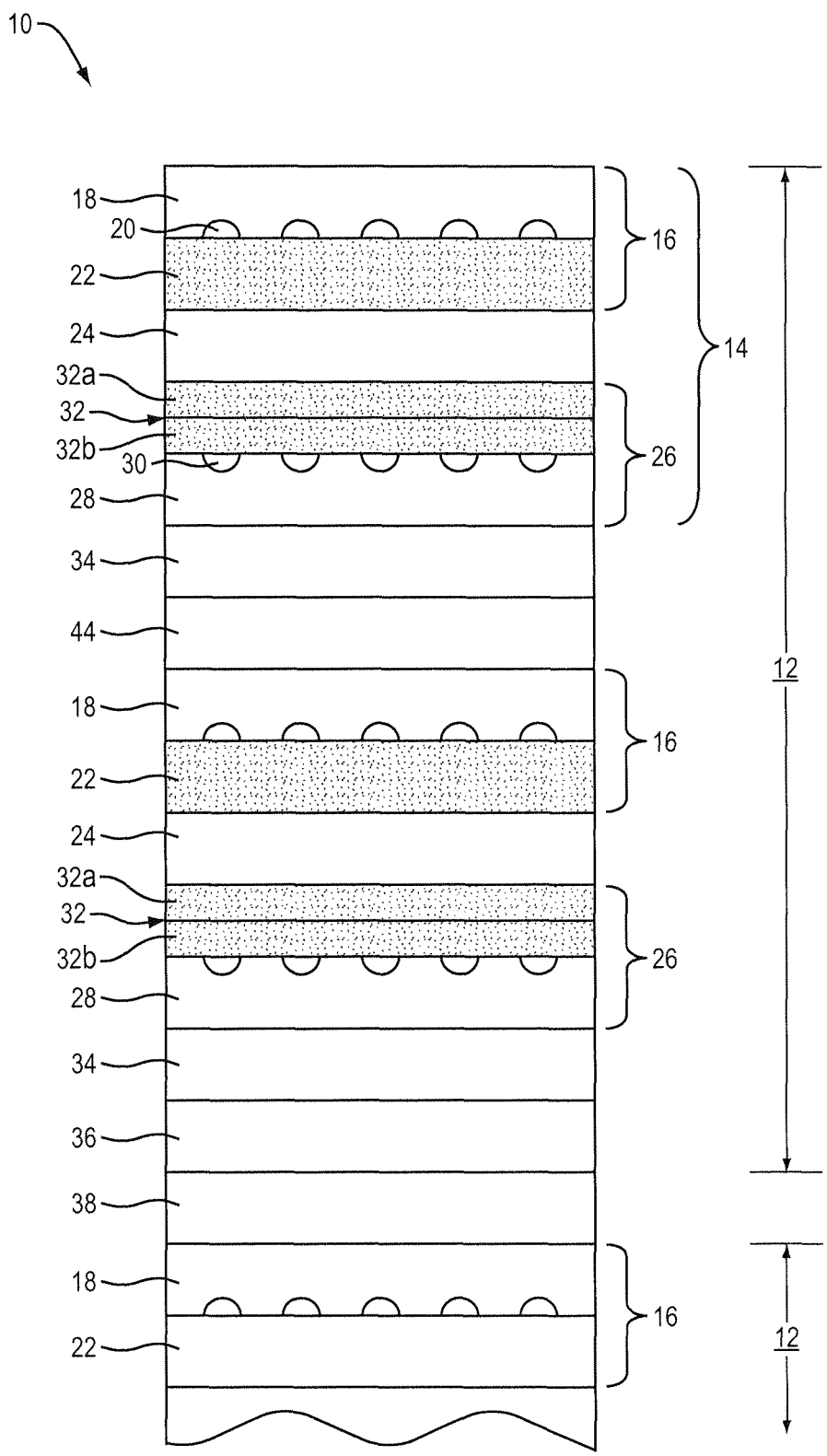
FIG. 1 is a schematic representation of one embodiment of a solid oxide fuel cell assembly of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating the embodiment of the present invention. The teachings of all patents, published applications and references cited herein are incorporated by reference in their entirety.

FIG. 1 shows solid oxide fuel cell (SOFC) assembly 10 of the invention. Fuel cell assembly 10 includes a plurality of subassemblies 12 and each subassembly 12 includes a plurality of subcells 14. Each subcell 14 includes anode 16, including bulk anode layer 18 defining channels 20, and active anode layer 22. Also included with each subcell 14 is solid oxide electrolyte layer 24. Each subcell 14 further includes cathode 26, including cathode bulk layer 28 defining cathode channels 30, and active cathode layer 32 that includes a porous cathode functional layer 32a and a porous intermediate cathode layer 32b partitioning the cathode bulk layer 28 and porous cathode functional layer 32a, porous intermediate cathode layer 32 having a porosity greater than that of cathode bulk layer 28. Cathode functional layer 32a can be composed of an electronic conductive material such as, for example, lanthanum strontium manganite (LSM), or LaNiFeO$_3$, and an ionic conductive material such as, for example, yttria-stabilized zirconia (YSZ), Sc-doped zirconia, or doped ceria. Alternatively, cathode functional layer 32a can be composed of a mixed ionic and electronic (MIEC) conducting material such as lanthanum strontium cobaltite ferrite (LSCF) or doped LaFeO$_3$, or mixtures of MIEC and ionic conducting material. The ratio of LSM/YSZ can be in the range from about 30/70 to about 70/30 weight %, preferably about 50/50 weight %. The median particle size ($d_{50}$) of both LSM and YSZ is in the range from about 0.1 µm to about 1 µm, and the overall porosity of cathode functional layer 32a is in a range of about 25 volume % to about 35 volume %. Cathode bulk layer 28 can be composed of an electronic conductive material such as LSM, LSCF, or lanthanum strontium ferrite (LSF), with a coarser grain size compared to cathode functional layer 32a, with a $d_{50}$ in a range of between about 0.5 µm to about 5 µm. The porosity of cathode layer 28 is lower than the porosity of cathode functional layer 32a, in a range of between about 5 vol % to about 25 vol %, or cathode layer 28 can be fully dense. Cathode intermediate layer 32b is typically composed of the same materials as cathode bulk layer 28, but with a porosity that is larger than that of layer 32a, in a range of between about 30 vol % to about 45 vol %.

Active anode layer 22 and active cathode layer 32 typically are porous. Further, anode channels 20 and cathode channels 30 are defined, in part, by bulk anode layer 18 and cathode bulk layer 28, respectively, and are further defined by active anode layer 22 and active cathode layer 32, respectively. Alternatively, channels in the anode layer can be fully enclosed within the layer or formed on top of the anode layer and defined by anode bond layer 44 between interconnect 34 and anode layer 18.

Any suitable cathode materials known in the art can be used for cathode 26, for example, in "High Temperature Solid Oxide Fuel Cells: Fundamentals, Design and Applications," pp. 119-143, Singhal, et al. Ed., Elsevier Ltd. (2003), the entire teachings of which are incorporated herein by reference. In one embodiment, cathode 26 includes a La-manganite (e.g., La$_{1-a}$MnO$_3$, where a is equal to or greater than zero, and equal to or less than 0.4) or La-ferrite based material. Typically, the La-manganite or La-ferrite based material is doped with one or more suitable dopants, such as Sr, Ca, Ba, Mg, Ni, Co or Fe. Examples of doped La-manganite based materials include LaSr-manganites (LSM) (e.g., La$_{1-k}$Sr$_k$MnO$_3$, where k is equal to or greater than 0.1, and equal to or less than 0.4, (La+Sr)/Mn is in a range of between about 1.0 and about 0.90 (molar ratio)) and LaCa-manganites (e.g., La$_{1-k}$Ca$_k$MnO$_3$, k is equal to or greater than 0.1, and equal to or less than 0.4, (La+Ca)/Mn is in a range of between about 1.0 and about 0.90 (molar ratio)). Examples of doped La-ferrite based materials include LaSrCo-ferrite (LSCF) (e.g., La$_{1-q}$Sr$_q$Co$_{1-j}$Fe$_j$O$_3$, where each of q and j independently is equal to or greater than 0.1, and equal to or less than 0.4, (La+Sr)/(Fe+Co) is in a range of between about 1.0 and about 0.90 (molar ratio)). In one specific embodiment, cathode 26 includes at least one of a LaSr-manganite (LSM) (e.g., La$_{1-k}$Sr$_k$MnO$_3$) and a LaSrCo-ferrite (LSCF). Common examples include (La$_{0.8}$Sr$_{0.2}$)$_{0.98}$Mn$_{3\pm\delta}$ (δ is equal to or greater than zero, and equal to or less than 0.3) and La$_{0.6}$Sr$_{0.4}$Co$_{42}$Fe$_{0.8}$O$_3$. Suitable materials for porous cathode functional layer 32a and porous intermediate cathode layer 32b each independently include lanthanum-manganite based or lanthanum-ferrite based materials, and preferably doped lanthanum manganite, La$_{1-k}$Sr$_k$MnO$_3$, where k is in a range of between about 0.1 and about 0.4, and the porous cathode functional layer further includes at least one member of the group consisting of yttria-stabilized zirconia (YSZ), cerium oxide, and scandia.

Any suitable anode materials known in the art can be used for anode 16, for example, in "High Temperature Solid Oxide Fuel Cells: Fundamentals, Design and Applications," pp. 149-169, Singhal, et al. Ed., Elsevier Ltd. (2003), the entire teachings of which are incorporated herein by reference. In one embodiment, anode 16 includes a nickel (Ni) cermet. As used herein, the phrase "Ni cermet" means a ceramic metal composite that includes Ni, such as about 20 wt %-70 wt % of Ni. Examples of Ni cermets are materials that include Ni and YSZ, such as ZrO$_2$ containing about 15 wt % of Y$_2$O$_3$, and materials that include Ni and Y-zirconia or Sc-zirconia. An additional example of an anode material is Cu-cerium oxide or Co—YSZ. Specific examples of Ni cermet include compositions between about 67 wt % Ni and 33 wt % YSZ and about 33 wt % Ni and 67 wt % YSZ.

Typically, the thickness of each of anode 16 and cathode 26 is, independently, in a range of between about 0.3 mm and about 2 mm. Specifically, the thickness of each of an anode 16 and cathode 26 is, independently, in a range of between about 0.5 mm and about 1.5 mm.

Solid oxide electrolyte 24 is between anode 16 and cathode 26. Any suitable solid oxide electrolytes known in the art can be used in the invention such as those described in "High Temperature Solid Oxide Fuel Cells: Fundamentals, Design and Applications," pp. 83-112, Singhal, et al. Ed., Elsevier Ltd. (2003), the entire teachings of which are incorporated herein by reference. Examples include $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.5}O_3$, $La_{0.9}Sr_{0.1}Ga_{0.8}Mg_{0.2}O_3$, $LaSrGaO_4$, $LaSrGa_3O_7$ or $La_{0.9}A_{0.1}GaO_3$ where A=Sr, Ca or Ba); and mixtures thereof. Other examples include doped yttrium-zirconate (e.g., $Y_2Zr_2O_7$), doped gadolinium-titanate (e.g., $Gd_2Ti_2O_7$) and brownmillerites (e.g., $Ba_2In_2O_6$ or $Ba_2In_2O_5$). In a specific embodiment, electrolyte 24 includes $ZrO_2$ doped with 8 mol % $Y_2O_3$ (i.e., 8 mol % $Y_2O_3$-doped $ZrO_2$.)

Typically, the thickness of solid electrolyte 24 is in a range of between about 5 µm and about 50 µm, such as between about 5 µm and about 20 µm, more preferably between about 5 µm and about 10 µm. Alternatively, the thickness of solid electrolyte 24 can be between about 20 µm and about 500, more preferably between about 100 µm and about 500 µm. In an embodiment employing solid electrolyte 24 having a thickness greater than about 100 µm, solid electrolyte 24 can provide structural support for subcells 14 and, consequently, subassembly 12.

Subcell 14 further includes interconnect 34. Any material known to be suitable for use as an interconnect layer can be employed. In an example of a suitable interconnect layer is one formed of chromium, and may further include rare earth elements, such as doped rare earth chromites. In one embodiment, interconnect layer 34 includes at least one of lanthanum strontium, calcium, cobalt, gallium, yttria, titanate and magnesium. In other particular embodiments, the interconnect layer can include ceramics, such as $LaSrCrO_3$, $LaMgCrO_3$, $LaCaCrO_3$, $YCrO_3$, $LaCrO_3$, $LaCoO_3$, $CaCrO_3$, $CaCoO_3$, $LaNiO_3$, $LaCrO_3$, $CaNiO_3$ and $CaCrO_3$. In another embodiment, interconnect 34 can include two layers, as described in U.S. patent application Ser. No. 12/316,806, filed Dec. 16, 2008 and published as US2009/0169958 A1 on Jul. 2, 2009, entitled, "Ceramic Interconnect For Fuel Cell Stacks," the entire teachings of which are incorporated herein by reference. Subcells 14, connected in series together, make up subassembly 12. Optionally, a non-functional terminal anode 36 can be located after each interconnect 34 at one end of subcell 14. Terminal anode 36 is not an operating anode, and can have a different composition from the anode. Specifically, the terminal anode can contain a certain fraction of the interconnect material to help improve the bond strength between anode bond layer 44 and the interconnect layer. Typically, the terminal anode can contain between about 33 wt % to about 67 wt % metallic phase, preferably nickel, and between about 67 wt % to about 33 wt % ceramic phase, preferably a mixture of YSZ and between about 30 wt % and about 70 wt % of the interconnect material.

A plurality of subassemblies 12 are connected in series. As shown in FIG. 1, subassemblies 12 are connected at terminal anode 36 of one subassembly 12 and anode 16 of another subassembly 12 by bonding layer 38. In one embodiment, anode bonding layer 44 has the same composition as subassembly bonding layer 38 but subassembly bonding layer 38 can have a thickness greater than or equal to anode bonding layer 44. Specific embodiments of material suitable for use as bonding layer 38 are known in the art, and include, for example, mixtures of a metallic phase, preferably Ni, with YSZ and potentially also the interconnect phase. The composition ranges for the individual constituents can be between about 33 wt % Ni and about 67 wt % Ni and between about 67 wt % about 33 wt % of ceramic phase. The ceramic phase is made of YSZ with between about 0 wt % and about 50 wt % of the interconnect phase. A specific example of bonding layer 38 and anode bonding layer 44 is 33 wt % Ni and 67 wt % YSZ. Other specific examples of subassemblies 12 connected in series with anode bonding layers 44, optional subassembly bonding layers 38, and optional terminal anodes 36 are shown in FIG. 6, wherein anode bulk layers 18 can contain gas channels 20 and cathode bulk layers 28 can contain gas channels 30. In another embodiment, bonding layer 38 and anode bonding layer 44 can be conformable bonding layers. "Conformable bonding layer" as that term is employed herein means a bonding layer that is adaptable, or conformable to change in dimension of adjacent layers during fabrication and use of a SOFC assembly of which it is a part, while still bonding one electrode, functional or non-functional, or interconnect, of one subassembly and an active electrode at one end of a subcell of an adjoining subassembly. Examples of suitable conformable bonding layers include metal meshes, metal felts or combinations thereof, preferably coated with nickel metal paste for good electrical conductivity. Stacks assembled with a conformable bonding layer would likely need to be placed in slight compression to ensure good electrical contact between the subcells or subassemblies and the conformable bonding layer.

SOFC fuel cell assembly 10 of the invention can include any suitable number of subassemblies 12, and any number of subcells 14 in each subassembly 12. In one embodiment, a subassembly of subcells will include between about six and about ten subcells, and each subassembly of fuel cell 10 will include between about four and about six subassemblies, each subassembly 12 separated from an adjacent subassembly 12 by a bonding layer 38. Stacks of SOFC fuel cell assemblies 10 can be connected in series or in parallel.

Figure 2A:
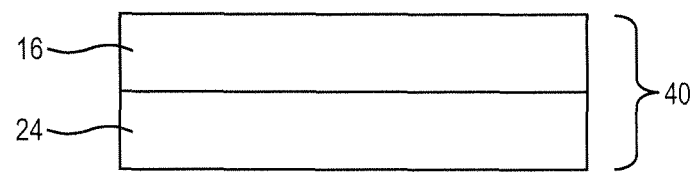
FIGS. 2A-B are schematic representations of one embodiment of a bulk cathode and interconnect subcomponent of a solid oxide fuel subcell fabricated according to the method of the invention, in part.

The invention also includes a method of forming a fuel cell assembly, such as described above. The method includes forming an anode subcomponent 40, shown in FIG. 2A. An anode subcomponent 40 includes anode layer 16 and electrolyte 24.

Anode layer 16 and electrolyte layer 24 can be formed by any suitable technique known in the art. For example, in one embodiment, anode subcomponent 40 can be formed by tape casting and lamination, die-pressing, warm pressing gel casting, spray coating, screen printing, roll compaction, extrusion, and injection molding.

Figure 2B:
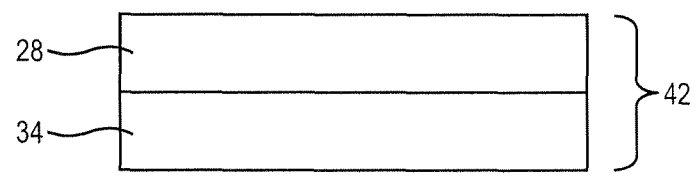

Separately, and apart from forming anode subcomponent 40, cathode subcomponent 42, shown in FIG. 2B, is formed. Cathode subcomponent 42 includes bulk cathode 28 and interconnect 34. Any suitable technique known in the art for forming cathode subcomponent 42 can be employed. In one embodiment, for example, fabrication of cathode subcomponent 42 includes steps such as tape casting and lamination, die-pressing, warm pressing gel casting, spray coating, screen printing, roll compaction, extrusion, and injection molding.

Figure 3A:
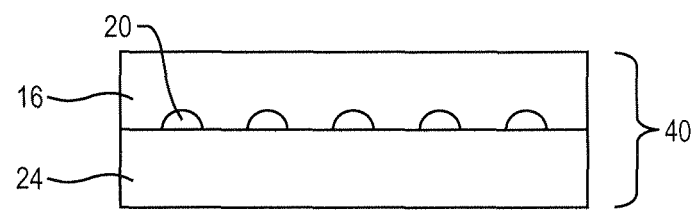
FIGS. 3A-C represent components of a solid oxide fuel subcell of the invention prior to combination to form a solid oxide fuel subcell.

In a particularly preferred embodiment, represented by FIG. 3, anode subcomponent 40, shown in FIG. 3A, includes anode layer 16, which defines, in part, channels 20. Anode subcomponent 40 includes anode layer 16 and electrolyte layer 24. Channels 20 can be formed by any suitable technique known in the art, such as, for example, incorporating shaped fugitives, embossing, cutting channels in tapes and then laminating the tapes to define channels, using extrusion through preforms, or using patterned rolls in roll compaction.

There exists a variety of possible materials for fugitives, such as, for example, graphite or fibers, that can be used to form the channels or passageways within the cathode and anode layers. Generally, the only limitations on the selection of materials would be that the material would burn or be out-gassed from the fuel cell during the firing process, and that the material is not reactive with the ceramic particles. These two conditions are adequately satisfied by organic based materials. Thus, the fibers can be natural fibers, cotton, bast fibers, cordage fibers, or animal fibers, such as wool, or they may be manufactured fibers, regenerated cellulose, cellulose diacetate, cellulose triacetate, polyamide, polyester, polyacrylic, polyvinyl, polyolefin resins, carbon or graphite fibers, or liquid crystal polymers. Alternatively, the fibers can be extruded lengths of binder material such as synthetic rubber, thermoplastics, or polyvinyl and extruded lengths of plasticizer material such as glycol and phthalate groups. In another embodiment, the material can be pasta, such as spaghetti.

Figure 3B:
Figure 3C:
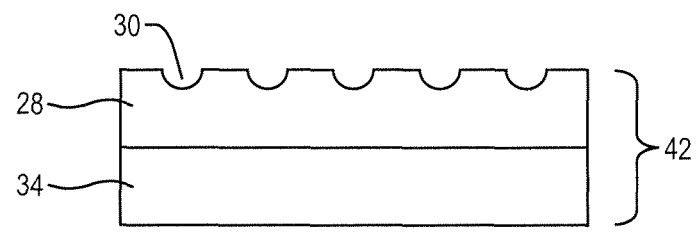

In another embodiment, cathode subcomponent 42 defines, in part, channels 30, as shown in FIG. 3C. The remainder of channels 30 will be defined upon assembly of cathode subcomponent 42, anode subcomponent 40, shown in FIG. 3A, and green functional cathode 32, shown in FIG. 3B. Channels 30 can be formed in bulk cathode 28 by any suitable technique known in the art, such as by a method that includes the steps of incorporating shaped fugitives, embossing, cutting channels in tapes and then laminating the tapes to define channels, using extrusion through performs, or using patterned rolls in roll compaction.

Green functional cathode 32, shown in FIG. 3B, is porous, at least after firing in combination with anode subcomponent 40 and cathode subcomponent 42. In one embodiment, green functional cathode 32 is composed of electronic conductive material such as, for example, LSM, and an ionic conductive material such as, for example, YSZ. The ratio of LSM/YSZ can be in the range from about 30/70 weight % to about 70/30 weight %, preferably about 50/50 weight %. Layer 32b is typically composed of the same materials as bulk cathode 28, such as LSM, LSCF, or lanthanum strontium ferrite (LSF), with a coarser grain size compared to cathode functional layer 32a, with a $d_{50}$ in a range of between about 0.5 µm to about 5 µm, but with a porosity that is larger than that of layer 32a, in a range of between about 30 vol % to about 45 vol %. The thickness of green functional cathode 32, prior to firing, can be in a range of between about 20 µm and about 200 µm, and preferably is in a range between about 20 µm and about 100 µm.

Anode subcomponents 40, cathode subcomponents 42, green functional cathode layers 32, and anode bond layers 44 are combined by placing green functional cathode layer 30 between electrolyte layer 24 of anode subcomponent 40 and cathode bulk layer 28 of cathode subcomponent 42 and placing anode bond layer 44 between anode subcomponent 40 and interconnect layer 34 of cathode subcomponent 42. The combined subcomponents 40, 42, and green functional cathode layer 32 and anode bond layer 44 are then fired at a suitable temperature to thereby sinter green functional cathode 32 and anode bond layer 44 and bind subcomponents 40 and 42 into a subassembly or a fuel cell stack. Typically, the subcomponents and green functional cathode layer 32 are co-fired at a temperature that is lower than that employed to fire anode subcomponent 40 and cathode subcomponent 40 and cathode subcomponent 42 during their separate fabrication. Although not wishing to be held to any particular theory, it is believed that separately fabricating anode subcomponent 40 and cathode subcomponent 42, prior to combination and bonding by co-firing with green functional cathode layer 32, provides greater flexibility to fire each subcomponent at optimal temperatures and periods of time without diminishing the opportunity to fire green functional cathode layer 32 at a distinct optimal temperature and period of time. In one embodiment, anode subcomponent 40, cathode subcomponent 42, green functional cathode layer 32 and anode bond layer 44 are bonded by co-firing at a temperature in a range of between about 1000° C. and about 1250° C., for a period of time in the range from about 0.5 hours to about 4 hours, and preferably at a temperature in a range of between about 1100° C. and about 1200° C., for a period of time in a range of between about 1 hour and about 2 hours.

Co-firing of anode subcomponent 40, cathode subcomponent 42, green functional cathode layer 32 and green anode bond layer 44 can form the fuel cell stack 8 consisting of several subcells 14 connected in series, as shown in FIG. 6. Alternatively, anode subcomponent 40, cathode subcomponent 42, green functional cathode layer 32, and green anode bonding layer 44 can be bonded by co-firing into a subassembly 12. Subassemblies 12 can then be combined in series, with bonding layers 38, into a fuel cell stack 8. It is also to be understood that the arrangement can be reversed, whereby each subassembly can have an interconnect at an active anode over each subcell and at the end of each subassembly, and a nonfunctional cathode can be placed at the interconnect at the end of each subassembly. Subassemblies can be combined to form a fuel cell stack, for example, between about 4 and about 6 subassemblies can be combined to form a fuel cell stack.

In one specific embodiment, a plurality of anode subcomponents 40, cathode subcomponents 42, green functional cathode layers 32 and green anode bond layer 44 can be arranged and co-fired at a suitable temperature, preferably lower than that employed to form each of the anode subcomponents 40 and cathode subcomponents 42, to thereby form a fuel cell stack 8. An example of a suitable anode bond layer is a layer consisting of Ni metal with YSZ ceramic or Ni with YSZ and interconnect ceramic material.

In a second embodiment, a plurality of anode subcomponents 40, cathode subcomponents 42 and green functional cathode layers 32 are co-fired at a suitable temperature, preferably lower than that employed to form each of the anode subcomponents 40 and cathode subcomponents 42, to thereby form fired subcells. The fired subcells 14 are then arranged together with conformable anode bond layer 44 and compressed into a fuel cell stack 8. An example of a suitable conformable bonding layer is a bonding layer that includes nickel mesh or nickel felt preferably coated with nickel paste.

In a third embodiment, a plurality of anode subcomponents 40, cathode subcomponents 42 that contain a terminal anode, green functional cathode layers 32 and green anode bond layer 44 can be arranged and co-fired at a suitable temperature, preferably lower than that employed to form each of the anode subcomponents 40 and cathode subcomponents 42, to thereby form a fuel cell stack 8. An example of a suitable anode bond layer is a layer consisting of Ni metal with YSZ ceramic or Ni with YSZ and interconnect ceramic material.

In a fourth embodiment, a plurality of anode subcomponents 40, cathode subcomponents 42 that contain a terminal anode and green functional cathode layers 32 are co-fired at a suitable temperature, preferably lower than that employed to form each of the anode subcomponents 40 and cathode subcomponents 42, to thereby form fired subcells. The fired subcells 14 are then arranged together with conformable anode bond layer 44 and compressed into a fuel cell stack 8. An example of a suitable conformable bonding layer is a bonding layer that includes nickel mesh or nickel felt preferably coated with Ni paste.

Figure 4A:
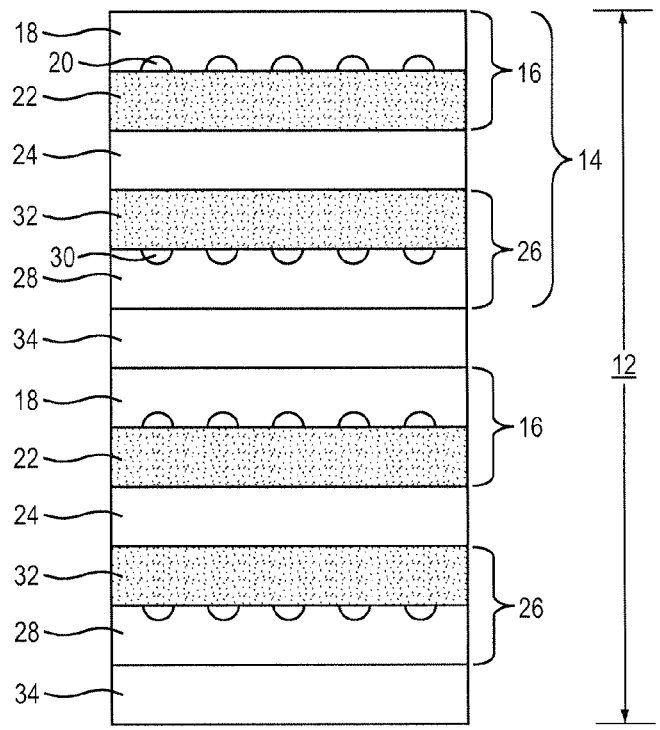
FIGS. 4A-C are schematic representations of an embodiment of two subassemblies and a bonding layer prior to combination to form a solid oxide fuel cell assembly of the invention.
Figure 4B:
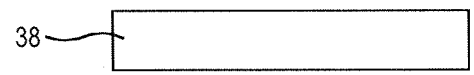
Figure 4C:
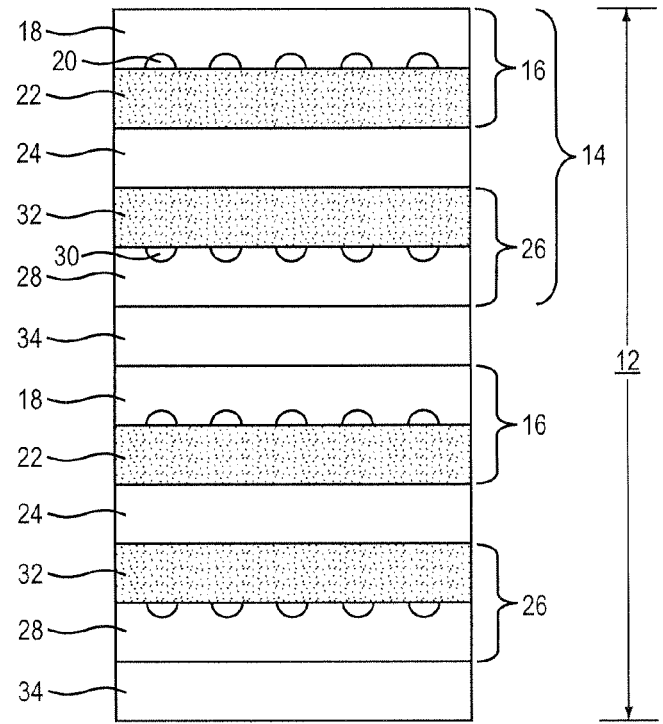
Figure 5:
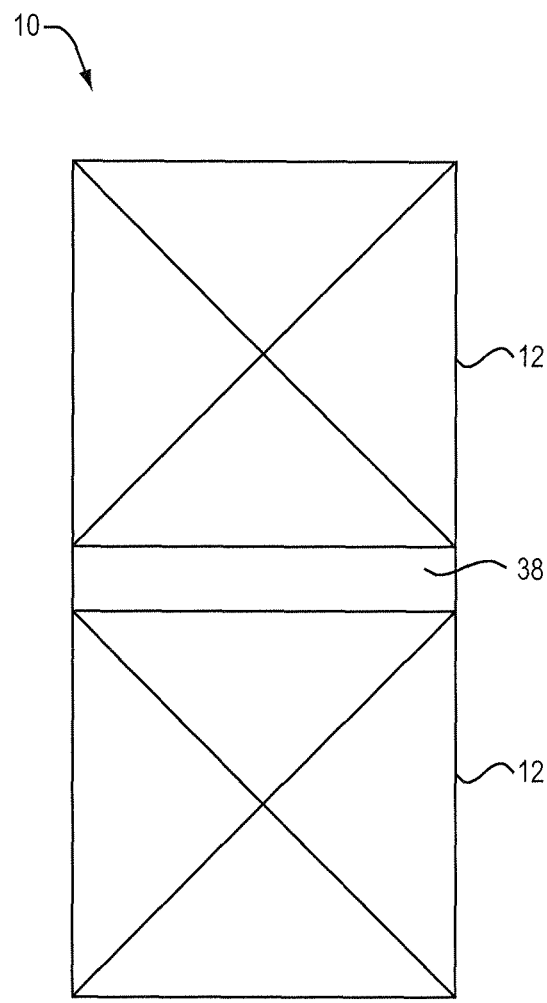
FIG. 5 is another schematic representation of one embodiment of a solid oxide fuel cell of the invention.

In a fifth embodiment, a plurality of anode subcomponents 40, cathode subcomponents 42, green functional cathode layers 32 and anode bond layers 44 are co-fired at a suitable temperature, preferably lower than that employed to form each of the anode subcomponents 40 and cathode subcomponents 42, to form a subassembly 12. A plurality of subassemblies 12 can be arranged in series with a bonding layer 38, as shown in FIG. 4B. Subassemblies 12 and bonding layer 38 can be arranged as shown in the respective orientation of FIGS. 4A, 4B, and 4C. The subassemblies are then bonded to each other by bonding layer 38 and then fired to form assembly 10, as shown in FIG. 5. An example of a suitable anode bond layer is a layer consisting of Ni metal with YSZ ceramic or Ni with YSZ ceramic and interconnect ceramic material.

In a sixth embodiment, a plurality of anode subcomponents 40, cathode subcomponents 42, green functional cathode layers 32 and anode bond layers 44 are co-fired at a suitable temperature, preferably lower than that employed to form each of the anode subcomponents 40 and cathode subcomponents 42, to form a subassembly 12. A plurality of subassemblies 12 can be arranged in series with a conformable bonding layer 38, as shown in FIG. 4B and then compressed into a fuel cell stack. An example of a suitable conformable bonding layer is a bonding layer that includes nickel mesh or nickel felt preferably coated with nickel paste.

In a seventh embodiment, a plurality of anode subcomponents 40, cathode subcomponents 42 that contain a terminal anode, green functional cathode layers 32 and anode bond layers 44 are co-fired at a suitable temperature, preferably lower than that employed to form each of the anode subcomponents 40 and cathode subcomponents 42, to form a subassembly 12. A plurality of subassemblies 12 can be arranged in series with a bonding layer 38, as shown in FIG. 4B. Subassemblies 12 and bonding layer 38 can be arranged as shown in the respective orientation of FIGS. 4A, 4B, and 4C. The subassemblies are then bonded to each other by bonding layer 38 and then fired to form assembly 10, as shown in FIG. 5. An example of a suitable anode bond layer is a layer consisting of Ni metal with YSZ ceramic or Ni with YSZ ceramic and interconnect ceramic material.

In an eighth embodiment, a plurality of anode subcomponents 40, cathode subcomponents 42 that contain a terminal anode, green functional cathode layers 32 and anode bond layers 44 are co-fired at a suitable temperature, preferably lower than that employed to form each of the anode subcomponents 40 and cathode subcomponents 42, to form a subassembly 12. A plurality of subassemblies 12 can be arranged in series with a conformable bonding layer 38, as shown in FIG. 4B and then compressed into a fuel cell stack. An example of a suitable conformable bonding layer is a bonding layer that includes nickel mesh or nickel felt preferably coated with nickel paste.

Fuel cell assembly 10 of the invention can be operated like other stacked fuel cell assemblies known in the art. In particular, oxygen gas, such as $O_2$ is reduced to oxygen ions ($O^{2-}$) at a cathode by directing the oxygen gas through channels 30 of cathode layer 28. A suitable fuel gas is directed through channels 20 of bulk anode 18 and is oxidized with oxygen ions migrating through solid oxide electrolyte, to thereby form at least water at the anode.

EQUIVALENTS

While this invention has been particularly shown and described with reference to exampled embodiments thereof, it will be understood by those in the art that various changes in form and details may be made therein without departing for the scope of the invention encompassed by the appended claims.

What is claimed is:

1. A solid oxide fuel cell, comprising:
    a) an anode layer;
    b) an electrolyte layer over a surface of the anode layer; and
    c) a cathode layer over a surface of the electrolyte layer, the cathode layer including,
        i) a porous cathode functional layer over the surface of the electrolyte layer,
        ii) a cathode bulk layer, and
        iii) a porous intermediate cathode layer partitioning the cathode bulk layer and the porous cathode functional layer, the porous intermediate cathode layer having a porosity greater than a porosity of the cathode bulk layer and greater than a porosity of the porous cathode functional layer, wherein the porosity of the cathode functional layer is in a range of about 25 volume % to about 35 volume %, wherein the porosity of the cathode bulk layer is in a range of about 0% to about 25 volume %, and wherein the porosity of the intermediate cathode layer is within a range of about 30 volume % to about 45 volume %.

2. The solid oxide fuel cell of claim 1, wherein the solid oxide fuel cell includes a plurality of subcells, each subcell including an anode, a cathode and an electrolyte partitioning the anode and cathode, and further including an interconnect between the anode of one subcell and the cathode of another subcell.

3. The solid oxide fuel cell of claim 2, wherein at least one interconnect is in direct contact with the cathode of a subcell.

4. The solid oxide fuel cell of claim 1, wherein the cathode bulk layer is porous and defines conduits apart from porosity of the cathode bulk layer.

5. The solid oxide fuel cell of claim 1, wherein the cathode bulk layer is dense and, together with the porous intermediate cathode layer, defines at least one conduit that is essentially parallel with the electrolyte layer.

6. The solid oxide fuel cell of claim 5, wherein the at least one conduit is defined in part by a channel in the cathode bulk layer.

7. A solid oxide fuel cell of claim 1, wherein a composition of the porous cathode functional layer is distinct from a composition of the porous intermediate cathode layer.

8. The solid oxide fuel cell of claim 1, wherein the porous cathode functional layer and the porous intermediate cathode layer each independently includes at least one member of the group consisting of a lanthanum-manganite or a lanthanum-ferrite based material, and wherein the porous cathode functional layer further includes at least one member of the group consisting of yttria stabilized zirconia, cerium oxide, and scandia.

9. The solid oxide fuel cell of claim 1, wherein the anode layer includes a bulk anode layer and a porous anode layer partitioning the bulk anode layer and the electrolyte.

10. The solid oxide fuel cell of claim 9, wherein the bulk anode layer is dense and, together with the porous anode layer, defines at least one conduit that is essentially parallel with the electrolyte layer.

11. The solid oxide fuel cell of claim 10, wherein the at least one conduit is defined in part by a channel in the anode bulk layer.

12. The solid oxide fuel cell of claim 1, wherein grains of the intermediate cathode layer have a median particle size ($d_{50}$ in a range of about 0.5 µm to about 5 µm.

13. A solid oxide fuel cell assembly, comprising:
  a) at least two subassemblies, each subassembly independently including at least one subcell, wherein each subcell includes,
    i) an anode layer,
    ii) an electrolyte layer over a surface of the anode layer, and
    iii) a cathode layer over a surface of the electrolyte layer, the cathode layer including,
      a porous cathode functional layer over the electrolyte layer,
      a cathode bulk layer, and
      a porous intermediate cathode layer partitioning the cathode bulk layer and the porous cathode functional layer, the porous intermediate cathode layer having a porosity greater than a porosity of the cathode bulk layer and greater than a porosity of the porous cathode functional layer, wherein the porosity of the cathode functional layer is in a range of about 25 volume % to about 35 volume %, wherein the porosity of the cathode bulk layer is in a range of about 0% to about 25 volume %, and wherein the porosity of the intermediate cathode layer is within a range of about 30 volume % to about 45 volume %; and
  b) a bonding layer between adjacent subassemblies.

14. The solid oxide fuel cell assembly of claim 13, further including,
  a) a terminal anode at an end of at least one subassembly, and,
  b) an electrical interconnect partitioning the terminal anode and a cathode of a subcell of the subassembly.

15. A method of fabricating at least one solid oxide fuel cell, comprising the steps of:
  a) forming an anode subcomponent, the anode subcomponent including,
    i) an anode layer; and
    ii) an electrolyte layer over the anode layer;
  b) forming a cathode subcomponent, the cathode subcomponent including:
    i) a cathode layer, the cathode layer including,
      a porous cathode functional layer,
      a cathode bulk layer, and
      a porous intermediate cathode layer partitioning the cathode bulk layer and the porous cathode functional layer, the porous intermediate cathode layer having a porosity greater than a porosity of the cathode bulk layer and greater than a porosity of the porous cathode functional layer, wherein the porosity of the cathode functional layer is in a range of about 25 volume % to about 35 volume %, wherein the porosity of the cathode bulk layer is in a range of about 0% to about 25 volume %, and wherein the porosity of the intermediate cathode layer is within a range of about 30 volume % to about 45 volume %; and
    ii) an interconnect layer over the cathode layer; and
  c) combining the anode subcomponent with the cathode subcomponent, whereby the cathode layer abuts the electrolyte layer, thereby forming the solid oxide fuel cell.

16. The method of claim 15, further including the step of forming the porous cathode functional layer at the electrolyte layer prior to combining the anode subcomponent with the cathode subcomponent.

17. The method of claim 16, further including the step of firing the combined subcomponents to thereby form the solid oxide fuel cell.

18. The method of claim 15, wherein the sintering temperature of the porous intermediate cathode layer is lower than that of the cathode bulk layer.

19. The method of claim 17, wherein the cathode layer of the cathode subcomponent defines at least one channel that abuts the porous intermediate cathode layer.

20. The method of claim 19, wherein at least one of the anode subcomponent and the cathode subcomponent are formed by a method that includes sintering.

21. The method of claim 20, wherein the anode subcomponent and the cathode subcomponent are combined by a method that includes sintering a green body precursor of the porous cathode functional layer located between the anode subcomponent and the cathode subcomponent at a temperature that is lower than the temperature at which the anode subcomponent and the cathode subcomponent were sintered.

* * * * *